United States Patent
Gobert et al.

(10) Patent No.: US 7,287,379 B2
(45) Date of Patent: Oct. 30, 2007

(54) TURBO COMPRESSOR SYSTEM FOR INTERNAL COMBUSTION ENGINE COMPRISING TWO SERIALLY PLACED TURBO UNITS WITH THEIR ROTATION AXES ESSENTIALLY CONCENTRIC

(75) Inventors: Ulrich Gobert, Göteborg (SE); Lars Sundin, Malmö (SE); Magnus Ising, Lund (SE); Daniel Grunditz, Öjersjö (SE); Per Andersson, Malmö (SE); Kent Giselmo, Vellinge (SE); Sebastian Krausche, Höllviken (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/164,236

(22) Filed: Nov. 15, 2005

(65) Prior Publication Data

US 2006/0123786 A1   Jun. 15, 2006

Related U.S. Application Data

(63) Continuation of application No. PCT/SE2004/000729, filed on May 11, 2004, now abandoned.

(30) Foreign Application Priority Data

May 15, 2003  (SE)  .................... 0301413

(51) Int. Cl.
  *F02B 37/00*    (2006.01)
  *F02B 37/02*    (2006.01)
  *F02B 37/013*   (2006.01)
  *F02B 33/44*    (2006.01)
  *F01D 25/26*    (2006.01)
  *F01D 25/24*    (2006.01)
  *F04D 29/60*    (2006.01)
  *F04D 29/40*    (2006.01)

(52) U.S. Cl. .................... 60/612; 417/409; 415/214.1; 415/213.1; 415/126

(58) Field of Classification Search .................. 60/612, 60/605.3; 123/562; 248/678, 637, 639, 248/646, 658, 660, 661, 664, 666, 667; 417/406, 417/407, 409; 415/214.1, 213.1, 126
See application file for complete search history.

(56) References Cited

U.S. PATENT DOCUMENTS 2,743,578 A  *  5/1956  Hazen ..................... 60/39.281

(Continued)

FOREIGN PATENT DOCUMENTS

DE           19948220 A1  *  1/2001

(Continued)

*Primary Examiner*—Thai-Ba Trieu
(74) *Attorney, Agent, or Firm*—Novak Druce & Quigg, LLP

(57) ABSTRACT

A turbocharger system for an internal combustion engine having at least one exhaust line for evacuating exhaust gases from the combustion chamber of the engine and at least one inlet line for supplying air to the combustion chamber. A high-pressure turbine interacts with a high-pressure compressor forming a high-pressure turbo unit with a common rotation axis. A low-pressure turbine interacts with a low-pressure compressor forming a low-pressure turbo unit with a common rotation axis. The high-pressure turbo unit and the low-pressure turbo unit are serially placed with the rotation axes essentially concentric and with the high-pressure turbine and the low-pressure turbine placed adjacent to each other and coupled together by an intermediate piece configured as a flow duct. The low-pressure turbo unit (22) is attached to one part of the internal combustion engine, while the high-pressure turbo unit is attached to another part of the engine.

9 Claims, 4 Drawing Sheets

U.S. PATENT DOCUMENTS

| | | | | |
|---|---|---|---|---|
| 3,289,436 A | * | 12/1966 | Groves et al. | 62/402 |
| 4,032,262 A | * | 6/1977 | Zehnder | 417/409 |
| 4,155,684 A | * | 5/1979 | Curiel et al. | 417/409 |
| 4,196,593 A | * | 4/1980 | Froeliger | 60/612 |
| 4,339,922 A | * | 7/1982 | Navarro | 60/602 |
| 4,344,289 A | * | 8/1982 | Curiel et al. | 60/612 |
| 4,400,945 A | * | 8/1983 | Deutschmann et al. | 60/612 |
| 4,464,902 A | * | 8/1984 | Mendle et al. | 60/612 |
| 4,496,291 A | * | 1/1985 | Grimmer | 417/247 |
| 4,563,132 A | * | 1/1986 | Grimmer | 417/247 |
| 4,679,992 A | | 7/1987 | Watanabe et al. | 417/364 |
| 6,802,184 B2 | * | 10/2004 | Huter et al. | 60/612 |
| 7,043,915 B2 | * | 5/2006 | Anello | 60/605.3 |

FOREIGN PATENT DOCUMENTS

| | | | | |
|---|---|---|---|---|
| JP | 60116821 A | * | 6/1985 |
| JP | 02125927 A | * | 5/1990 |
| JP | 2005120936 A | * | 5/2005 |
| JP | 2005120937 A | * | 5/2005 |
| JP | 2005133651 A | * | 5/2005 |

* cited by examiner

TURBO COMPRESSOR SYSTEM FOR INTERNAL COMBUSTION ENGINE COMPRISING TWO SERIALLY PLACED TURBO UNITS WITH THEIR ROTATION AXES ESSENTIALLY CONCENTRIC

CROSS-REFERENCE TO RELATED APPLICATIONS

The present application is a continuation patent application of International Application No. PCT/SE2004/000729 filed 11 May 2004 now abandoned which was published in English pursuant to Article 21(2) of the Patent Cooperation Treaty, and which claims priority to Swedish Application No. 0301413-1 filed 15 May 2003. Said applications are expressly incorporated herein by reference in their entireties.

FIELD OF THE INVENTION

The present invention relates to a turbocharger system for an internal combustion engine having at least one exhaust line for evacuating exhaust gases from the combustion chamber of the engine and at least one inlet line for supplying air to the combustion chamber. The turbocharger system includes a high-pressure turbine, which interacts with a high-pressure compressor forming a high-pressure turbo unit with a common rotation axis and a low-pressure turbine that interacts with a low-pressure compressor to form a low-pressure turbo unit with a common rotation axis, for extracting energy from the exhaust flow of the engine and pressurizing the inlet air of the engine.

BACKGROUND OF THE INVENTION

Turbocharger systems for supercharging diesel-type internal combustion engines, preferably for heavy-duty vehicles, usually comprises a single-stage compressor driven by a single-stage turbine, both of the radial type. Turbocharger systems with two-stage supercharge are also found, sometimes also including intermediate cooling, but such installations are usually very space-consuming. Technical solutions of this kind are therefore difficult to apply to motor vehicles in which space is severely limited.

Traditional turbochargers used in two-stage supercharging systems have to be placed with their axes laterally offset, since the flow leaving the high-pressure turbine is axial, while the inlet to the low-pressure turbine is radial. Hence, there has to be a 90° bend in the gas duct. This bend takes up a lot of space and causes large pressure losses, which have an adverse effect upon the overall efficiency.

Superchargers suitable for a diesel engine of 6 to 20 liters cubic capacity normally have an efficiency, under stationary conditions, of between 50% and 60% ($\eta_{compressor} * \eta_{mechanical} * \eta_{turbine}$). In contemporary diesel engines the efficiency benefit is lower than for future engines which will require higher charging pressure. Examples of systems which raise the supercharging requirement are exhaust gas recirculation for lower nitrogen oxide emissions or systems offering variable control of inlet valves.

Turbocharger systems with higher efficiency than 60%, under stationary conditions, offer a greater prospect of meeting future demands for environmentally friendly and fuel-efficient engines. Until recently, environmental demands upon diesel engines have usually led to worse efficiency meaning that the energy resource of the fuel is not best utilized.

SUMMARY OF THE INVENTION

One object of the present invention is to produce a highly effective turbocharger system which can be applied to vehicles without installation problems.

In at least one embodiment, the invention takes the form of a turbocharger system for an internal combustion engine having at least one exhaust line for evacuating exhaust gases from the combustion chamber of the engine and at least one inlet line for supplying air to the combustion chamber. The system comprises (includes, but is not necessarily limited to) a high-pressure turbine, which interacts with a high-pressure compressor and hereupon forms a high-pressure turbo unit with a common rotation axis,—and a low-pressure turbine, which interacts with—a low-pressure compressor to form a low-pressure turbo unit with a common rotation axis. The system is used for extracting energy from the exhaust flow of the engine. The low-pressure turbine is of the axial type in that the high-pressure turbo unit and the low-pressure turbo unit are serially placed with the rotation axes essentially concentric and with the high-pressure turbine and the low-pressure turbine placed adjacent to each other and coupled together by an intermediate piece configured as a flow duct. The duct is arranged to allow a certain eccentricity between the two rotation axes, and the low-pressure turbo unit is attached to one part of the internal combustion engine while the high-pressure turbo unit is attached to another part of the engine. The terms "internal combustion engine" and "engine" are also meant to include parts belonging to an engine, such as, for example, the cylinder head, the flywheel casing and the transmission casing.

Advantageous illustrative embodiments of the invention can be derived from the following independent patent claims.

BRIEF DESCRIPTION OF THE DRAWINGS

The invention will be described in greater detail below with reference to illustrative embodiments shown in the appended drawings, in which.

DESCRIPTION OF ILLUSTRATIVE EMBODIMENTS

The invention relates to an installation of a supercharging system for, in the first place, diesel engines having a cubic capacity of between about 6 liters and about 20 liters, for use preferably in heavy-duty vehicles such as trucks, buses and construction machinery. The supercharging system has the characteristic that it offers a considerably more effective supercharge than current systems. The supercharger is realized in two stages with two series-connected, radial-type compressors with intermediate cooling. The first stage, referred to as the low-pressure compressor, is driven by a low-pressure turbine of the axial type. The second stage, the high-pressure compressor, is driven by a high-pressure turbine of the radial type.

Figure 1:
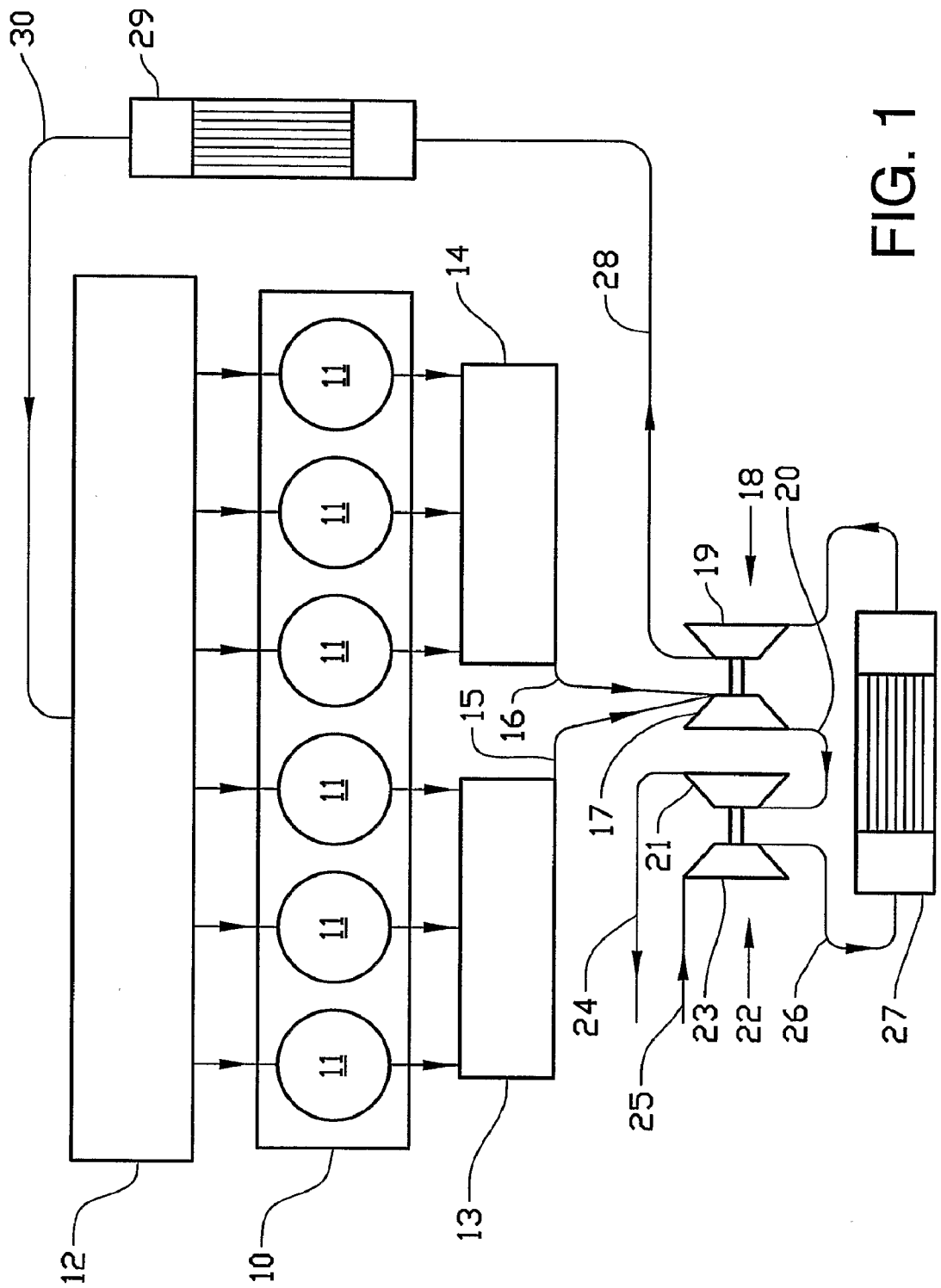
FIG. 1 shows diagrammatically an internal combustion engine having a two-stage turbocharger system according to the invention.

FIG. 1 shows an engine block 10 having six engine cylinders 11, which communicate in a conventional manner with an inlet manifold 12 and two separate exhaust manifolds 13, 14. Each of these two exhaust manifolds receives exhaust gases from three of the engine cylinders. The exhaust gases are led through separate pipes 15,16 up to a turbine 17 in a high-pressure turbo unit 18, which comprises a compressor 19 mounted on a common shaft with the turbine 17.

The exhaust gases are led onward through a pipe 20 to a turbine 21 in a low-pressure turbo unit 22, which comprises a compressor 23 mounted on a common shaft with the turbine 21. The exhaust gases are finally led onward through a pipe 24 to the exhaust system of the engine, which can comprise units for the after-treatment of exhaust gases.

Filtered inlet air is admitted to the engine through the pipe 25 and led to the compressor 23 of the low-pressure turbo unit 22. A pipe 26 leads the inlet air onward through a first charge-air cooler 27 to the compressor 19 of the high-pressure turbo unit 18. After this two-stage supercharge with intermediate cooling, the inlet air is led onward through the pipe 28 to a second charge-air cooler 29, whereafter the inlet air reaches the inlet manifold 12 via the pipe 30.

Figure 2:
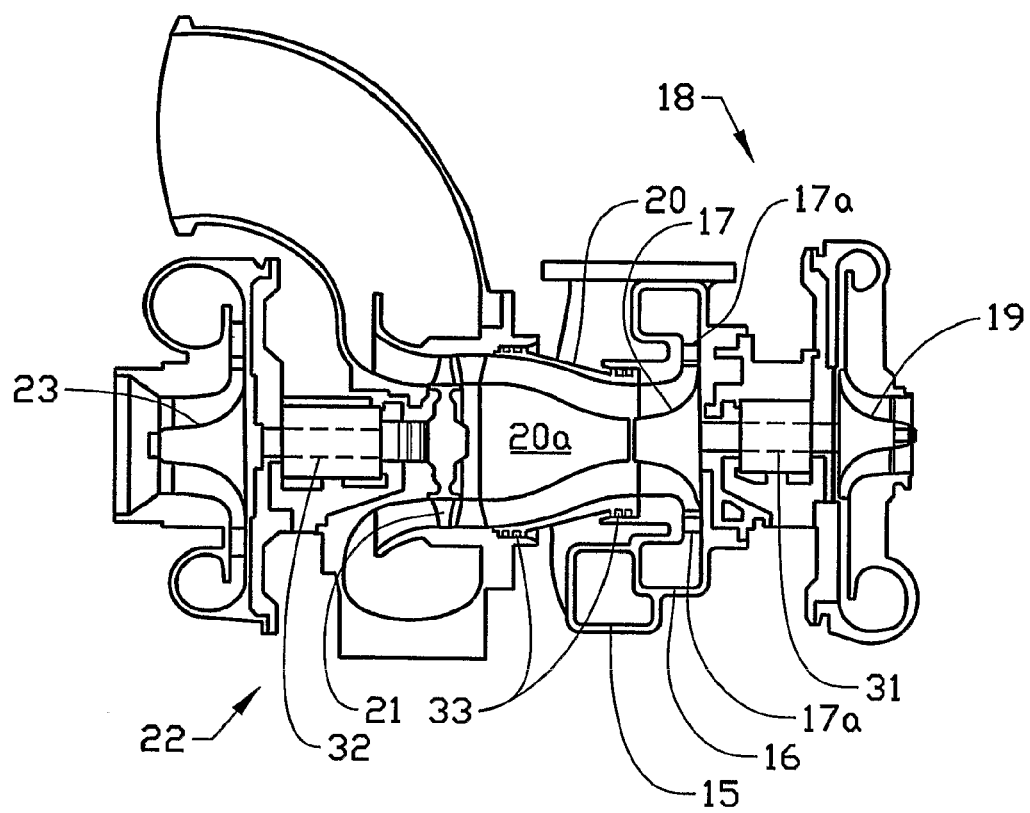
FIG. 2 is a longitudinal section through the two turbocharger stages forming the turbocharger system.

The turbocharger system according to the invention is shown in greater detail in FIG. 2, which illustrates the double, spiral inlets 15, 16 to the high-pressure turbine 17, each of which provides half the turbine with gas flow via inlet guide rails 17a. The high-pressure turbine 17 is of the conventional radial type and is connected to the low-pressure turbine 21 by the short intermediate duct 20, which is usable since the low-pressure turbine is of the axial type. This short flow path minimizes pressure losses between the turbine stages.

Figure 3:
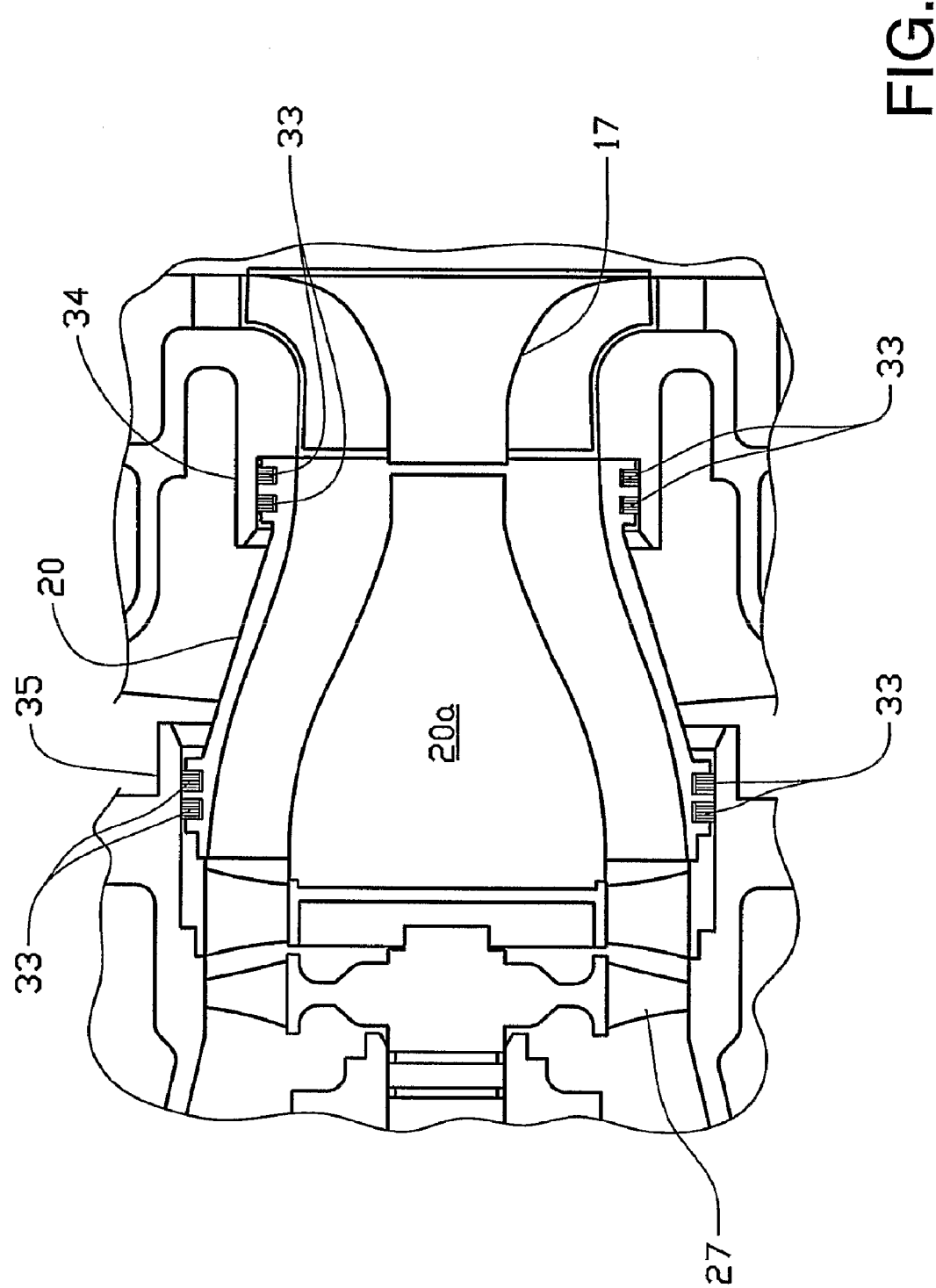
FIG. 3 is a partial enlargement of FIG. 2, which more clearly shows an intermediate piece between the two turbocharger stages.

The high-pressure turbine 17 is mounted together with the high-pressure compressor 19 on the shaft 31. The low-pressure turbine 21 is correspondingly mounted together with the low-pressure compressor 23 on the shaft 32. The two turbo units 18, 22 are orientated along essentially the same longitudinal axis. The intermediate duct 20 is equipped with seals 33, which are more clearly apparent from FIG. 3 and which combat installation tensions and leakage by allowing a certain mobility in the axial and radial directions, which absorbs thermal stresses and certain deficiency of assembly.

To this end, the seals 33 are configured as elastic piston rings with axial mobility in, respectively, a cylindrical portion 34 of the outlet of the high-pressure turbine 17 and a cylindrical portion 35 of the inlet of the low-pressure turbine 21. The seals 33 are mounted in grooves in the intermediate piece 20. The inner duct of the intermediate piece 20 is annular, having a centrally placed body 20a of a cross-section which increases in the downstream direction of the duct.

Figure 4:
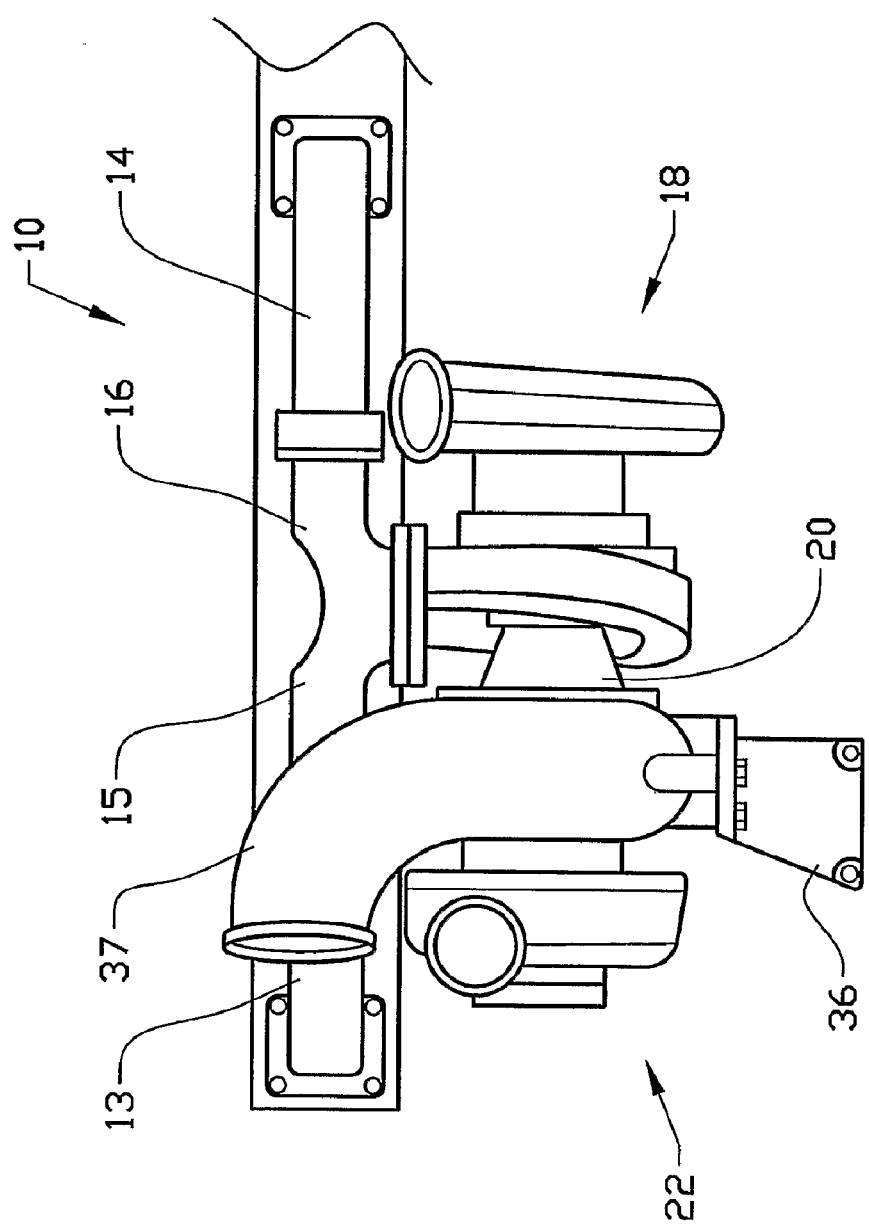
FIG. 4 is a partially broken side view of an internal combustion engine having a turbocharger system installed according to the invention.

From FIG. 4 it is evident that the low-pressure turbo unit 22 is mounted on the engine block 10 by means of a bracket 36, which is connected by screws to the outlet 37 of the low-pressure turbine 21. The high-pressure turbo unit 18 is mounted conventionally against the exhaust manifold 13,14 of the engine. In other illustrative embodiments of the invention, other engine components could be used for the suspension mounting of the turbocharger, such as, for example, the cylinder head, the flywheel casing and the transmission casing. It is also possible to mount the turbocharger on various parts of an exhaust manifold.

The turbocharger can thus be placed serially beside the engine, essentially parallel with the longitudinal axis thereof and located such that the high-pressure compressor is facing forward in the longitudinal direction of the engine, while the low-pressure compressor is facing rearward. This placement is advantageous, since the induction port from the air filter of the engine is normally in a heavy goods vehicle placed in the rear part of the engine compartment, which produces a short air duct 25 (see FIG. 1). Correspondingly, it is an advantage to have the high-pressure compressor facing forward, since this receives its air from the intermediate cooler 27, which can be placed at the front of the engine compartment. However, the invention is by no means limited to this orientation of turbocharger and cooler.

The invention should not be considered limited to the illustrative embodiments described above, but rather a number of further variants and modifications are conceivable within the scope of the patent claims. For example, the turbocharger system according to the invention is described in connection with a six-cylinder diesel engine, but the system is applicable to all the various piston engines from one cylinder and upwards and which are driven in a two-stroke or four-stroke cycle.

What is claimed is:

1. A turbocharger system for an internal combustion engine (10) having at least one exhaust line (15,16) for evacuating exhaust gases from the combustion chamber (11) of the engine and at least one inlet line (12) for supplying air to said combustion chamber, said turbo-charging system comprising a high-pressure turbine (17) which interacts with a high-pressure compressor (19) forming a high-pressure turbo unit (18) with a common rotation axis (31) and a low-pressure turbine (21) which interacts with a low-pressure compressor (23) forming a low-pressure turbo unit (22) with a common rotation axis (32) for extracting energy from the exhaust flow of the engine and pressurizing the inlet air of the engine, said low-pressure turbine (21) is of the axial type and the high-pressure turbo unit (18) and the low-pressure turbo unit (22) being sequentially located on substantially coincident axes (31, 32) and with the high-pressure turbine (17) and the low-pressure turbine (21) placed adjacent to each other and coupled together by an intermediate piece (20) configured as a flow duct arranged to allow a certain eccentricity between the two rotation axes, and the low-pressure turbo unit (22) is attached to one part of the internal combustion engine (10) and the high-pressure turbo unit (18) is attached to another part of the engine (10).

2. The turbocharger system as recited claim 1, wherein the high-pressure turbo unit (18) and the low-pressure turbo unit (22) are serially placed beside the internal combustion engine (10).

3. The turbocharger system as recited in claim 2, wherein the two units (18, 22) are placed essentially parallel with the crankshaft of the engine (10).

4. The turbocharger system as recited in claim 1, wherein the low-pressure turbo unit (22) is mounted in the engine block (10), via the outlet (37) of the low-pressure turbine (21), by means of a bracket (36).

5. A turbocharger system for an internal combustion engine (10) having at least one exhaust line (15,16) for evacuating exhaust gases from the combustion chamber (11) of the engine and at least one inlet line (12) for supplying air to said combustion chamber, said turbo-charging system comprising a high-pressure turbine (17) which interacts with a high-pressure compressor (19) forming a high-pressure turbo unit (18) with a common rotation axis (31) and a low-pressure turbine (21) which interacts with a low-pressure compressor (23) forming a low-pressure turbo unit (22) with a common rotation axis (32) for extracting energy from the exhaust flow of the engine and pressurizing the inlet air of the engine, said low-pressure turbine (21) is of the axial type and the high-pressure turbo unit (18) and the low-pressure turbo unit (22) being sequentially located on substantially coincident axes (31, 32) and with the high-pressure turbine (17) and the low-pressure turbine (21) placed adjacent to each other and coupled together by an intermediate piece (20) configured as a flow duct arranged to allow a certain eccentricity between the two rotation axes, and the low-pressure turbo unit (22) is attached to one part of the internal combustion engine (10) and the high-pressure turbo unit (18) is attached to another part of the engine (10) and wherein the low-pressure turbo unit (22) is attached to the cylinder block (10) of the internal combustion engine and the high-pressure turbo unit (18) is attached to the exhaust manifold (15, 16) of the engine.

6. The turbocharger system as recited in claim 5, wherein the turbo units (18, 22) are orientated such that the high-pressure compressor (19) is facing forward in the longitudinal direction of the engine (10), whilst the low-pressure compressor (23) is facing rearward.

7. A turbocharger system for an internal combustion engine (10) having at least one exhaust line (15,16) for evacuating exhaust gases from the combustion chamber (11) of the engine and at least one inlet line (12) for supplying air to said combustion chamber, said turbo-charging system comprising a high-pressure turbine (17) which interacts with a high-pressure compressor (19) forming a high-pressure turbo unit (18) with a common rotation axis (31) and a low-pressure turbine (21) which interacts with a low-pressure compressor (23) forming a low-pressure turbo unit (22) with a common rotation axis (32) for extracting energy from the exhaust flow of the engine and pressurizing the inlet air of the engine, said low-pressure turbine (21) is of the axial type and the high-pressure turbo unit (18) and the low-pressure turbo unit (22) being sequentially located on substantially coincident axes (31, 32) and with the high-pressure turbine (17) and the low-pressure turbine (21) placed adjacent to each other and coupled together by an intermediate piece (20) configured as a flow duct arranged to allow a certain eccentricity between the two rotation axes, and the low-pressure turbo unit (22) is attached to one part of the internal combustion engine (10) and the high-pressure turbo unit (18) is attached to another part of the engine (10) and wherein the intermediate piece (20) is provided with sealing rings (33) which are elastic in the radial direction.

8. The turbocharger system as recited in claim 7, wherein the sealing rings (33) are mounted slidably in, respectively, a cylindrical portion (34) of the outlet of the high-pressure turbine (17) and a cylindrical portion (35) of the inlet of the low- pressure turbine (21).

9. A turbocharger system for an internal combustion engine (10) having at least one exhaust line (15,16) for evacuating exhaust gases from the combustion chamber (11) of the engine and at least one inlet line (12) for supplying air to said combustion chamber, said turbo-charging system comprising a high-pressure turbine (17) which interacts with a high-pressure compressor (19) forming a high-pressure turbo unit (18) with a common rotation axis (31) and a low-pressure turbine (21) which interacts with a low-pressure compressor (23) forming a low-pressure turbo unit (22) with a common rotation axis (32) for extracting energy from the exhaust flow of the engine and pressurizing the inlet air of the engine, said low-pressure turbine (21) is of the axial type and the high-pressure turbo unit (18) and the low-pressure turbo unit (22) being sequentially located on substantially coincident axes (31, 32) and with the high-pressure turbine (17) and the low-pressure turbine (21) placed adjacent to each other and coupled together by an intermediate piece (20) configured as a flow duct arranged to allow a certain eccentricity between the two rotation axes, and the low- pressure turbo unit (22) is attached to one part of the internal combustion engine (10) and the high- pressure turbo unit (18) is attached to another part of the engine (10) and wherein the inner duct of the intermediate piece (20) is annular, having an inner body (20a) of a cross section which increases in the direction downstream.

\* \* \* \* \*